(12) United States Patent
Byen et al.

(10) Patent No.: US 12,734,928 B2
(45) Date of Patent: Sep. 15, 2026

(54) MULTI-CHANNEL CHARGING SYSTEM

(71) Applicant: HYOSUNG CORPORATION, Seoul (KR)

(72) Inventors: Byeng Joo Byen, Suwon-si (KR); Byung Hwan Jeong, Gwacheon-si (KR)

(73) Assignee: HYOSUNG CORPORATION, Seoul (KR)

( * ) Notice: Subject to any disclaimer, the term of this patent is extended or adjusted under 35 U.S.C. 154(b) by 864 days.

(21) Appl. No.: 18/016,675

(22) PCT Filed: Nov. 26, 2021

(86) PCT No.: PCT/KR2021/017612
§ 371 (c)(1),
(2) Date: Jan. 18, 2023

(87) PCT Pub. No.: WO2023/042962
PCT Pub. Date: Mar. 23, 2023

(65) Prior Publication Data

US 2024/0246445 A1 Jul. 25, 2024

(30) Foreign Application Priority Data

Sep. 15, 2021 (KR) ........................ 10-2021-0123309

(51) Int. Cl.
*B60L 53/67* (2019.01)
*B60L 53/53* (2019.01)
*B60L 53/66* (2019.01)

(52) U.S. Cl.
CPC ............... *B60L 53/67* (2019.02); *B60L 53/53* (2019.02); *B60L 53/66* (2019.02); *B60L 2210/10* (2013.01)

(58) Field of Classification Search
CPC ...................................................... B60L 53/67
USPC ......................................................... 320/107
See application file for complete search history.

(56) References Cited

U.S. PATENT DOCUMENTS 10,011,181 B2 7/2018 Dudar et al.
12,149,079 B2 * 11/2024 Seroff ..................... B60L 53/68
2013/0057209 A1 * 3/2013 Nergaard ............... B60L 1/003 320/109
2019/0001833 A1 1/2019 Coburn et al.
2022/0089055 A1 * 3/2022 TenHouten ............ B60L 53/67
(Continued)

FOREIGN PATENT DOCUMENTS

EP 4112362 A1 * 1/2023 ............. B60L 53/63
JP 2015507914 A * 3/2015 ............. B60L 53/11
JP 6639776 B2 2/2020
(Continued)

*Primary Examiner* — Jerry D Robbins
(74) *Attorney, Agent, or Firm* — Goldilocks Zone IP Law

(57) ABSTRACT

A multi-channel charging system includes a power source supplying power, a transformer connected to the power source, a plurality of charging ports connected to the transformer and charging or discharging each object, a converter converting power between the power source and the transformer or between the object and the transformer, and a controller controlling the converter or each of the objects, wherein the controller transmits/receives a signal to or from each of the objects, controls power transmission/reception between each of the objects, or controls power transmission/reception between the power source and the objects.

9 Claims, 6 Drawing Sheets

(56) References Cited

U.S. PATENT DOCUMENTS

| | | | | |
|---|---|---|---|---|
| 2022/0212551 | A1* | 7/2022 | Bouman | H02J 7/00 |
| 2022/0348101 | A1* | 11/2022 | Keister | H02M 1/0074 |

FOREIGN PATENT DOCUMENTS

| | | | |
|---|---|---|---|
| KR | 10-1998-0084286 | A | 12/1998 |
| KR | 10-2014-0142598 | A | 12/2014 |
| KR | 10-2015-0031988 | A | 3/2015 |
| KR | 10-1755732 | B1 | 7/2017 |
| KR | 10-2018-0104788 | A | 9/2018 |
| KR | 10-1973782 | B1 | 4/2019 |
| KR | 10-2019-0062226 | A | 6/2019 |
| WO | 2013/058614 | A2 | 4/2013 |

* cited by examiner

MULTI-CHANNEL CHARGING SYSTEM

CROSS-REFERENCE TO RELATED APPLICATIONS

This application claims the benefit under 35 U.S.C. section 371, of PCT International Application No. PCT/KR2021/017612, filed on Nov. 26, 2021, which claims foreign priority to Korean Patent Application No. 10-2021-0123309, filed on Sep. 15, 2021, in the Korean Intellectual Property Office, both of which are hereby incorporated by reference in their entireties.

TECHNICAL FIELD

The following example embodiments relate to a multi-channel charging system.

BACKGROUND ART

The era of popularization of electric vehicles has arrived as elimination of internal combustion locomotives, which are a major factor of greenhouse gas, becomes a global trend. For expansion of electric vehicles, a requirement of charging infrastructure with decent quality may need to be satisfied. As an increasing interest in the efficiency of an electric vehicle battery, there is an increasing interest in the energy efficiency of charging infrastructure. In addition, there is an increasing demand for the decent quality of charging efficiency, such as a charging speed at a charging station.

It may be required to install multiple charging stations in major base facilities with high vehicle traffic. In addition, there is an increasing demand for increasing a ratio of renewable energy in a power grid to forge synergy between expansion of electric vehicles and conversion to renewable energy.

Various methods have been proposed related to a function to charge and accommodate multiple electric vehicles in the charging infrastructure. In addition, system models for stable power transmission have been proposed and related techniques and research have been developed.

An electric vehicle and an operating method thereof are disclosed in PCT Publication No. WO2013/058614 A2.

The above description is information the inventor(s) acquired during the course of conceiving the present disclosure, or already possessed at the time, and is not necessarily art publicly known before the present application was filed.

DISCLOSURE OF THE INVENTION

Technical Goals

An aspect provides a multi-channel charging system that enables multiple charging with a multi-port based on a charging mode or simultaneous charging between vehicles.

An aspect provides a multi-channel charging system that has a charging/discharging function to help charging between vehicles through a charger.

An aspect provides a multi-channel charging system that enables power trading between individuals.

Technical Solutions

According to an example embodiment, a multi-channel charging system includes a power source supplying power, a transformer connected to the power source, a plurality of charging ports connected to the transformer and charging or discharging each object, a converter converting power between the power source and the transformer or between the object and the transformer, and a controller controlling the converter or each of the objects, wherein the controller transmits/receives a signal to or from each of the objects, controls power transmission/reception between each of the objects, or controls power transmission/reception between the power source and the objects.

According to an aspect, the plurality of charging ports is connected in parallel, and the controller controls each of the objects to exchange power with each other through the plurality of charging ports.

According to an aspect, the plurality of charging ports includes a first charging port, a second charging port, and a third charging port, wherein the controller controls one of the plurality of charging ports to transmit power to the other charging ports or receive power from the other charging ports.

According to an aspect, the controller controls a power transmission direction between each of the objects and the plurality of charging ports.

According to an aspect, the converter includes an isolated converter or a direct current (DC)/DC converter.

According to an aspect, the multi-channel charging system further includes an energy storage in which power is temporarily stored.

According to another example embodiment, a multi-channel charging system includes an integrated power source supplying power, a plurality of chargers connected to the integrated power source to transmit/receive power and charging or discharging each object, a controller controlling power transmission/reception between the chargers, and an energy storage in which power is temporarily stored, wherein the plurality of chargers is connected in parallel, and the controller transmits/receives a signal to or from each of the objects, controls power transmission/reception between each of the objects, or controls power transmission/reception between the integrated power source and the objects.

According to an aspect, the charger includes a transformer connected to the integrated power source, a converter converting power between the integrated power source and the transformer or between the object and the transformer, and a plurality of charging ports connected to the transformer and charging or discharging each object, wherein the controller controls each of the objects to exchange power with each other through the plurality of charging ports, and the converter includes an isolated converter or a DC/DC converter.

According to an aspect, the charger includes a first charger, a second charger, and a third charger, wherein the controller controls power transmission/reception among the first charger, the second charger, and the third charger and controls power transmission/reception between the charger and the integrated power source, and the controller controls one of the first charger, the second charger, and the third charger to transmit power to the other chargers or receive power from the other chargers.

Effects

A multi-channel charging system according to an example embodiment may enable multiple charging with a multi-port based on a charging mode or simultaneous charging between vehicles.

A multi-channel charging system according to an example embodiment may provide a charging/discharging function to help charging between vehicles through a charger.

A multi-channel charging system according to an example embodiment may enable power trading between individuals.

BEST MODE FOR CARRYING OUT THE INVENTION

Figure 1:
FIG. 1 schematically illustrates a first operation example of a multi-channel charging system according to an example embodiment.
Figure 1:
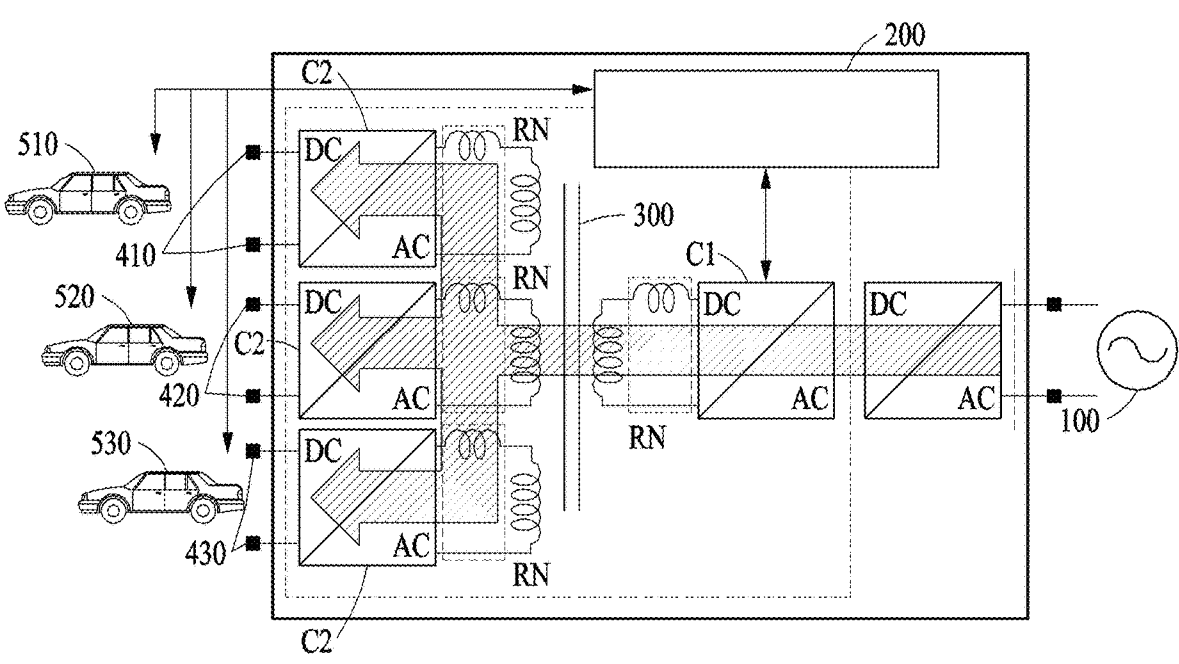

Hereinafter, example embodiments will be described in detail with reference to the accompanying drawings. However, various alterations and modifications may be made to the example embodiments. Here, the example embodiments are not construed as limited to the disclosure. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
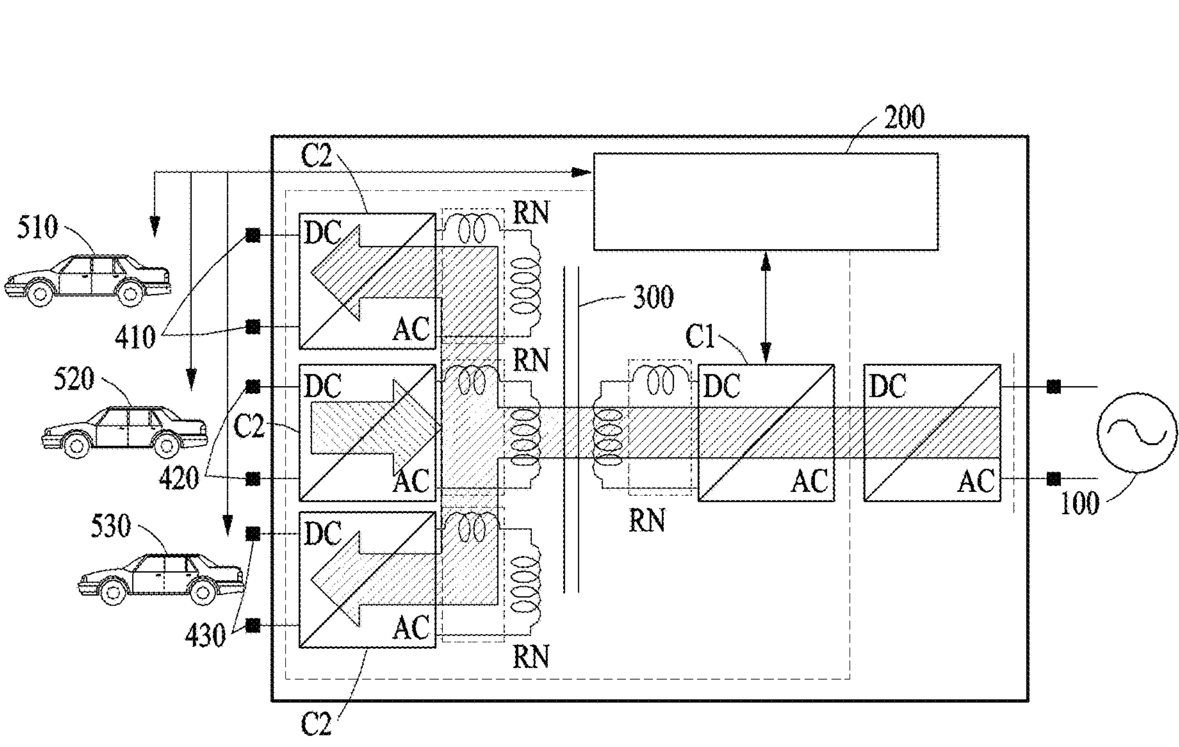
FIG. 2 schematically illustrates a second operation example of the multi-channel charging system according to an example embodiment.
Figure 3:
FIG. 3 schematically illustrates a third operation example of the multi-channel charging system according to an example embodiment.
Figure 3:
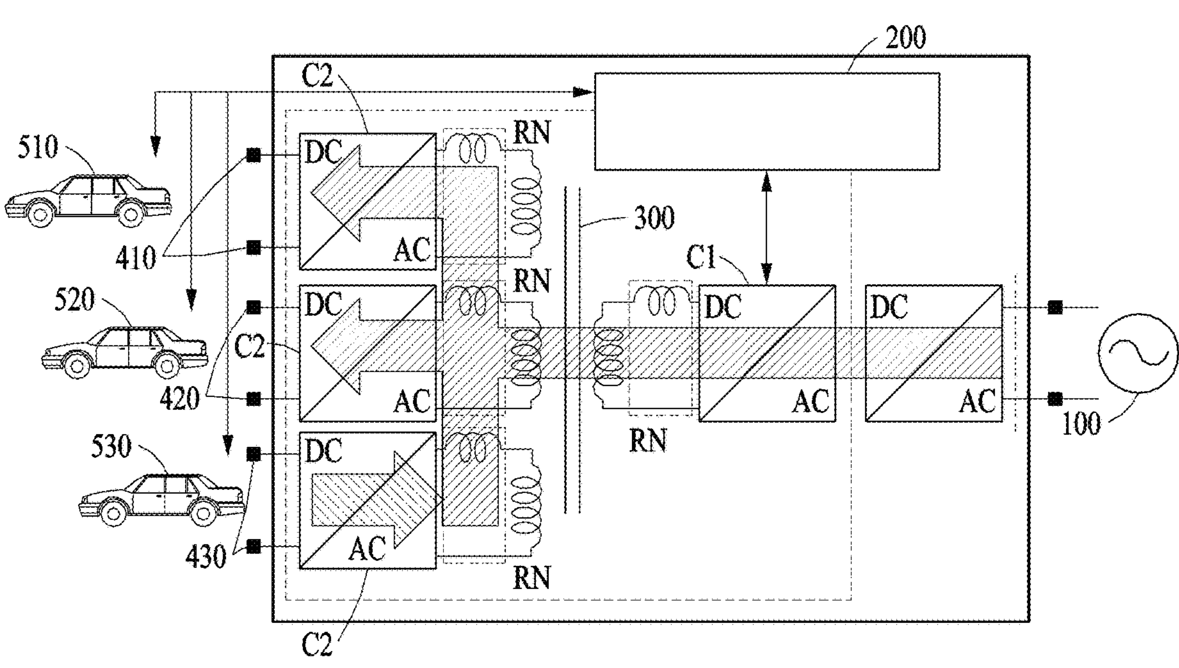
Figure 4:
FIG. 4 schematically illustrates a fourth operation example of the multi-channel charging system according to an example embodiment.
Figure 4:
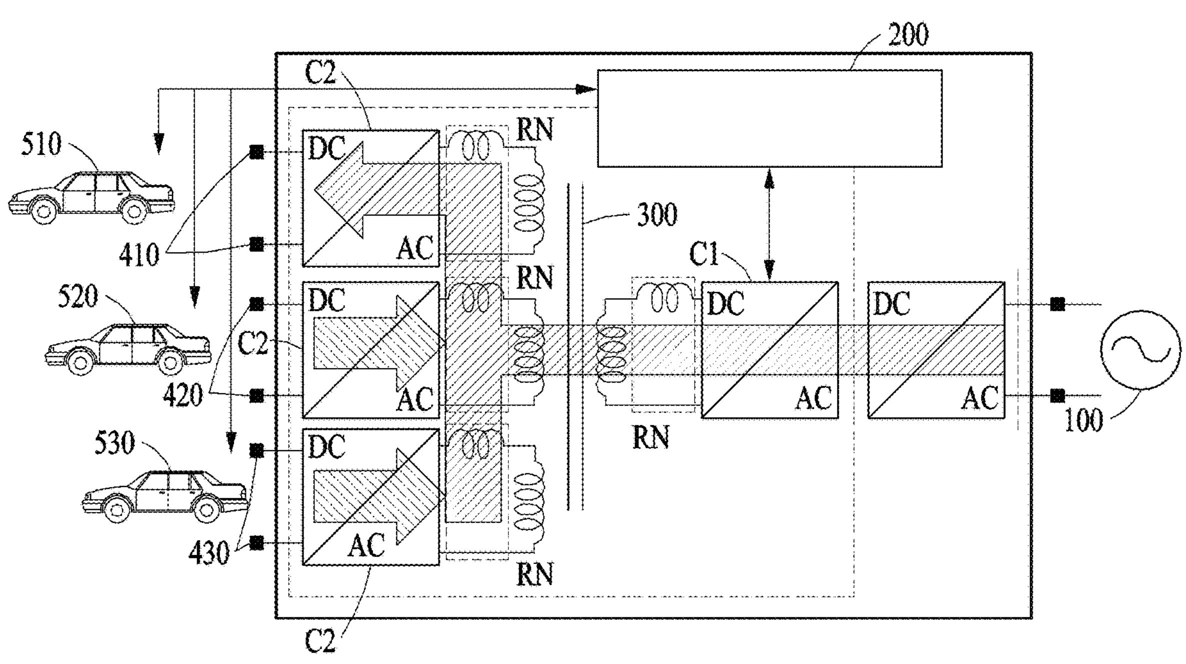
Figure 5:
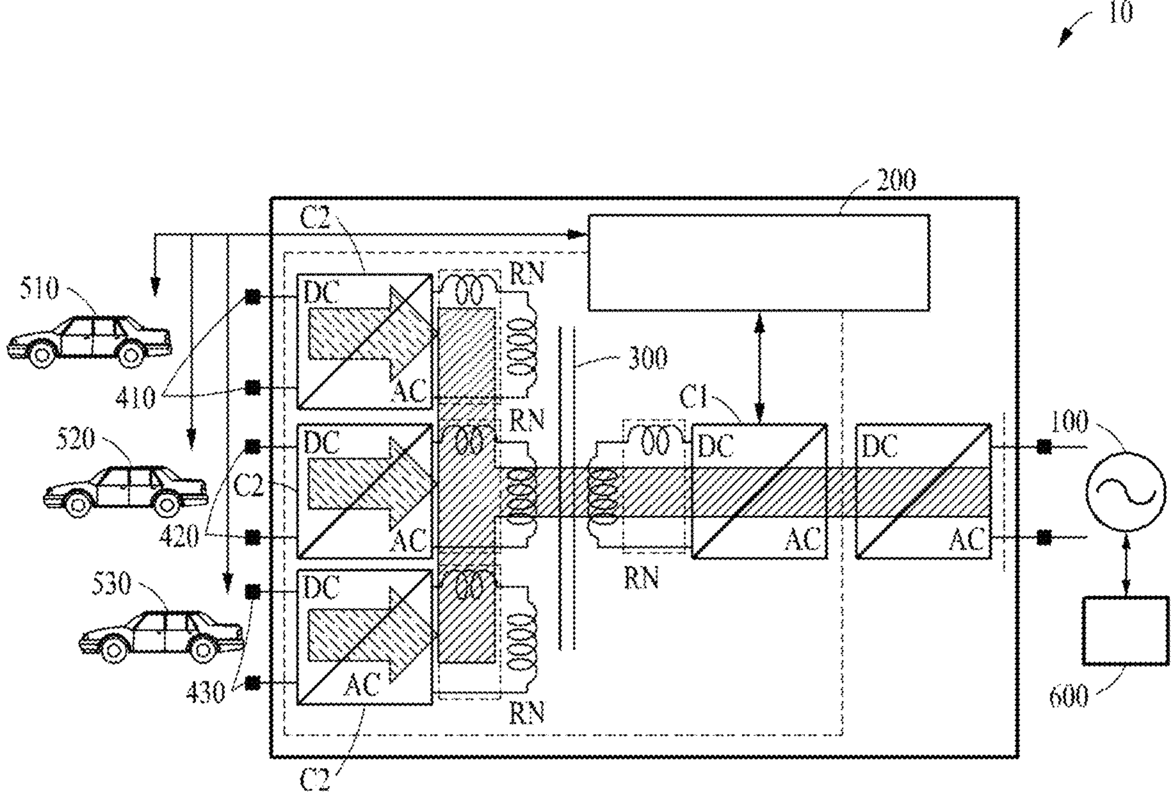
FIG. 5 schematically illustrates a fifth operation example of the multi-channel charging system according to an example embodiment.

FIG. 1 schematically illustrates a first operation example of a multi-channel charging system 10 according to an example embodiment. FIG. 2 schematically illustrates a second operation example of the multi-channel charging system 10 according to an example embodiment. FIG. 3 schematically illustrates a third operation example of the multi-channel charging system 10 according to an example embodiment. FIG. 4 schematically illustrates a fourth operation example of the multi-channel charging system 10 according to an example embodiment. FIG. 5 schematically illustrates a fifth operation example of the multi-channel charging system 10 according to an example embodiment.

Referring to FIG. 1, the multi-channel charging system 10 according to an example embodiment may include a transformer 300, which is provided with power by a power source 100, such as a power system, controlled by a controller 200, and connected to the power source 100, and a plurality of charging ports 410, 420, and 430 connected to the transformer 300 and charging or discharging objects 510, 520, and 530, respectively.

In addition, the multi-channel charging system 10 according to an example embodiment may include a first converter C1 that converts power between the power source 100 and the transformer 300 or a second converter C2 that converts power between the transformer 300 and each of the objects 510, 520, and 530.

By controlling the converters C1 and C2, the controller 200 may transmit/receive a signal to or from each of the objects 510, 520, and 530, may control power transmission/reception among the objects 510, 520, and 530, or may control power transmission/reception between the power source 100 and the objects 510, 520, and 530.

The multi-channel charging system 10 according to an example embodiment may be efficiently operated by including a direct current (DC) interconnected power grid, that is, a DC grid.

The plurality of charging ports 410, 420, and 430 may include a first charging port 410, a second charging port 420, and a third charging port 430. The plurality of charging ports 410, 420, and 430 may be connected in parallel. The controller 200 may control each of the objects 510, 520, and 530 to exchange power with each other through the plurality of charging ports 410, 420, and 430.

The controller 200 may control one of the plurality of charging ports 410, 420, and 430 to transmit power to the other charging ports 410, 420, and 430, or receive power from the other charging ports 410, 420, and 430.

For example, as shown in FIG. 1, power may be transmitted from the power source 100 to all charging ports 410, 420, and 430 and power may be supplied to all objects 510, 520, and 530.

Alternatively, as shown in FIG. 2, from the object 520 disposed in the middle of the objects 510, 520, and 530 connected in parallel, power may be supplied to the other objects 510 and 530 through the charging ports 410, 420, and 430.

Alternatively, as shown in FIG. 3, from the object 530 disposed on the side among the objects 510, 520, and 530 connected in parallel, power may be supplied to the other objects 510 and 520 through the charging ports 410, 420, and 430.

Alternatively, as shown in FIG. 4, from the objects 520 and 530 disposed on the sides among the objects 510, 520, and 530 connected in parallel, power may be supplied to the other object 510 through the charging ports 410, 420, and 430.

Alternatively, as shown in FIG. 5, from all of the objects 510, 520, and 530, power may be transmitted and supplied to the power source 100 through the charging ports 410, 420, and 430.

The controller 200 may control a power transmission direction among each of the objects 510, 520, and 530 and the plurality of charging ports 410, 420, and 430.

The first converter C1 and the second converter C2 may include an isolated converter or a DC/DC converter.

The multi-channel charging system 10 according to an example embodiment may further include an energy storage 600 in which power is temporarily stored. For example, the energy storage may store renewable energy in an energy storage system (ESS).

Figure 6:
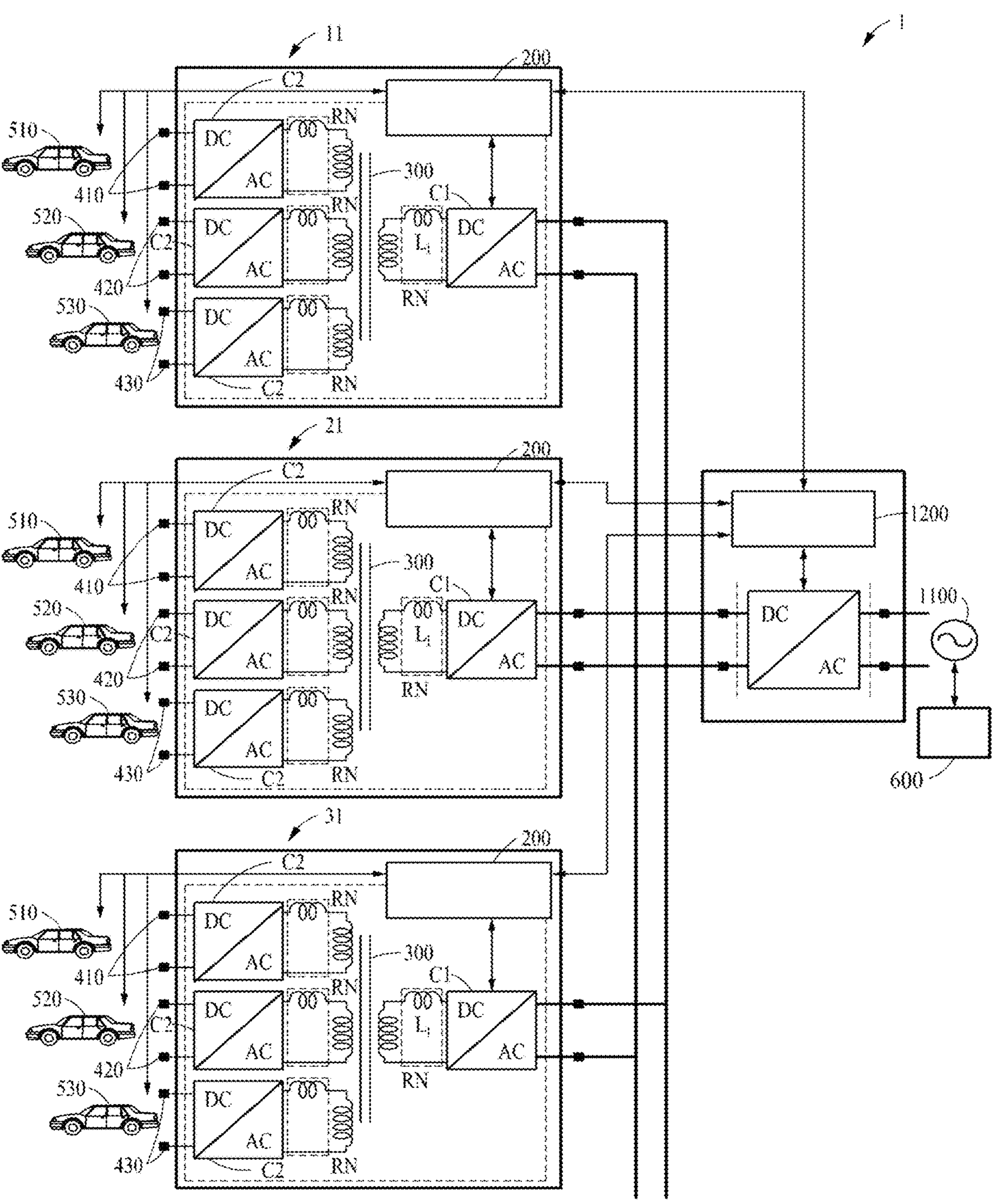
FIG. 6 schematically illustrates an integrated multi-channel charging system according to another example embodiment.

FIG. 6 schematically illustrates an integrated multi-channel charging system 1 according to another example embodiment.

Referring to FIG. 6, the integrated multi-channel charging system 1 may include a plurality of chargers 10, 20, and 30, which are provided with power from an integrated power source 1100, connected to the integrated power source 1100 to transmit/receive power, and charge or discharge each of objects 510, 520, and 530. A controller 1200 may control power transmission/reception between the chargers 10, 20, and 30.

The integrated multi-channel charging system 1 according to another example embodiment may also include an energy storage 600 in which power is temporarily stored.

The plurality of chargers 10, 20, and 30 may be connected in parallel and for example, may be provided as a DC grid. The controller 1200 may transmit/receive a signal to or from each of the objects 510, 520, and 530, may control power transmission/reception among the objects 510, 520, and 530, or may control power transmission/reception between the integrated power source 1100 and the objects 510, 520, and 530.

The chargers 10, 20, and 30 may include a transformer 300 connected to the integrated power source 1100. The chargers 10, 20, and 30 may include a first converter C1 that converts power between the integrated power source 1100 and the transformer 300, or a second converter C2 that converts power between the transformer 300 and the objects 510, 520, and 530, and a plurality of charging ports 410, 420, and 430 connected to the transformer 300 and charging or discharging each of the objects 510, 520, and 530. The first converter C1 and the second converter C2 may include an isolated converter or a DC/DC converter. By controlling the first converter C1 and the second converter C2, the controller 1200 may control the objects 510, 520, and 530 to exchange power with each other through the plurality of charging ports 410, 420, and 430.

The chargers 10, 20, and 30 may include a first charger 10, a second charger 20, and the third charger 30. The controller 1200 may control power transmission/reception among the first charger 10, the second charger 20, and the third charger 30 and may control power transmission/reception between the integrated power source 1100 and the chargers 10, 20, and 30. The controller 1200 may control one of the first charger 10, the second charger 20, and the third charger 30 to transmit power to the other chargers 10, 20, and 30 or receive power from the other chargers 10, 20, and 30.

In the multi-channel charging system 10 according to an example embodiment, a charger and a charging vehicle are not in a 1:1 relationship, many chargers and a wide installation space may not need to simultaneously charge many vehicles.

The multi-channel charging system 10 according to an example embodiment may supply power from a charger to a vehicle as well as transmit power from a vehicle to a charger, and thus, charging from a vehicle to a vehicle through a charger may be available.

In the multi-channel charging system 10 according to an example embodiment, power trading between individuals may be allowed as a billing system for vehicle charging is established.

In the multi-channel charging system 10 according to an example embodiment, not only simple charging but also a charging/discharging function that helps charging between vehicles through a charger may be enabled.

In the multi-channel charging system 10 according to an example embodiment, when there is a difference in a charging rate between cities or between a city and a highway, by using the difference, power trading between individuals using a vehicle may be activated.

The multi-channel charging system 10 according to an example embodiment may enable multiple charging with a multi-port based on a charging mode or may enable simultaneous charging between vehicles.

The methods according to the above-described examples may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A multi-channel charging system comprising:

a power source supplying power;

a transformer connected to the power source;

a plurality of charging ports connected to the transformer and charging or discharging each object;

a converter converting power between the power source and the transformer or between the object and the transformer; and a controller controlling the converter or each of the objects, wherein the controller transmits/receives a signal to or from each of the objects, controls a direct power transmission/reception between the each of the objects.

2. The multi-channel charging system of claim 1, wherein the plurality of charging ports is connected in parallel, and the controller controls each of the objects to exchange power with each other through the plurality of charging ports.

3. The multi-channel charging system of claim 2, wherein the converter comprises an isolated converter or a direct current (DC)/DC converter.

4. The multi-channel charging system of claim 1, wherein the plurality of charging ports comprises:

a first charging port;

a second charging port; and a third charging port, wherein the controller controls one of the plurality of charging ports to transmit power to the other charging ports or receive power from the other charging ports.

5. The multi-channel charging system of claim 4, wherein the controller controls a power transmission direction between each of the objects and the plurality of charging ports.

6. The multi-channel charging system of claim 1, further comprising:

an energy storage in which power is temporarily stored.

7. A multi-channel charging system comprising:

an integrated power source supplying power;

a plurality of chargers connected to the integrated power source to transmit/receive power and charging or discharging each object;

a controller controlling power transmission/reception between the chargers; and an energy storage in which power is temporarily stored, wherein the plurality of chargers is connected in parallel, and the controller transmits/receives a signal to or from each of the objects, controls a direct power transmission/reception between the each of the objects.

8. The multi-channel charging system of claim 7, wherein the charger comprises:

a transformer connected to the integrated power source;

a converter converting power between the integrated power source and the transformer or between the object and the transformer; and a plurality of charging ports connected to the transformer and charging or discharging each object, wherein the controller controls each of the objects to exchange power with each other through the plurality of charging ports, and the converter comprises an isolated converter or a direct current (DC)/DC converter.

9. The multi-channel charging system of claim 8, wherein the charger comprises:

a first charger;

a second charger; and a third charger, wherein the controller controls power transmission/reception among the first charger, the second charger, and the third charger and controls power transmission/reception between the charger and the integrated power source, and the controller controls one of the first charger, the second charger, and the third charger to transmit power to the other chargers or receive power from the other chargers.

* * * * *